United States Patent
Hall et al.

(10) Patent No.: US 7,689,484 B2
(45) Date of Patent: Mar. 30, 2010

(54) METHOD AND SYSTEM FOR FINANCING ACQUISITION OF VEHICLES

(75) Inventors: Christopher Hall, Ann Arbor, MI (US); Bradley Gayton, Ann Arbor, MI (US); Bernie Johnson, Fort Meyers, FL (US); John Polizzi, Grosse Pointe Woods, MI (US); Michael Johnson, Columbus, OH (US)

(73) Assignee: Ford Motor Company, Dearborn, MI (US)

( * ) Notice: Subject to any disclaimer, the term of this patent is extended or adjusted under 35 U.S.C. 154(b) by 1922 days.

(21) Appl. No.: 10/604,536

(22) Filed: Jul. 29, 2003

(65) Prior Publication Data

US 2005/0027646 A1 Feb. 3, 2005

(51) Int. Cl.
*G06Q 40/00* (2006.01)
(52) U.S. Cl. .......................... 705/35; 705/38
(58) Field of Classification Search .................. None
See application file for complete search history.

(56) References Cited

U.S. PATENT DOCUMENTS

| | | | |
|---|---|---|---|
| 4,736,294 A | * | 4/1988 | Gill et al. ................. 705/38 |
| 6,167,384 A | * | 12/2000 | Graff ........................ 705/35 |
| 6,502,080 B1 | | 12/2002 | Eichorst et al. |
| 7,024,373 B1 | * | 4/2006 | Reynolds et al. ........... 705/14 |
| 2001/0034690 A1 | | 10/2001 | Joseph |
| 2001/0034700 A1 | | 10/2001 | Foss et al. |
| 2002/0046144 A1 | | 4/2002 | Graff |
| 2002/0099618 A1 | | 7/2002 | Stiberman |
| 2003/0046199 A1 | | 3/2003 | Murase et al. |
| 2003/0110108 A1 | * | 6/2003 | Sabella ..................... 705/35 |
| 2005/0289036 A1 | * | 12/2005 | LaCombe et al. .......... 705/35 |

OTHER PUBLICATIONS

Eckhouse, John, Lease is More, Jan. 1991, VARbusiness p. 39.*
Eckhouse, John, Lease is More, Jan. 1991. VARbusiness p. 39.*
Weise, Steven, UCC Article 9 -Personal Property Secured Transactions, The Business Lawyer, Aug. 1991, 52 pgs.*
Barclays unveils new leasing program, Times of Zambia, Mar. 18, 1999.*

* cited by examiner

*Primary Examiner*—Hani Kazimi
*Assistant Examiner*—Carol See
(74) *Attorney, Agent, or Firm*—Raymond L. Coppiellie; Brooks Kushman P.C.

(57) ABSTRACT

In one embodiment of the present invention, a method for financing acquisition of a vehicle is disclosed. The method comprises receiving a future interest in a vehicle in consideration for a future interest price upon transfer of a legal title in the vehicle in consideration for a legal title price.

17 Claims, 6 Drawing Sheets

*Fig. 6*

| 144 | Buyer (and Co-Buyer) Name and Address (including County and Zip Code) | CREDITOR (Seller Name and Address) 146 |

| 148 | Term (months) 150 Vehicle Return Date | 152 Reversionary Amount |

| 154 | New/Used | Mileage | Year and Make | Model | GVW If Truck (lbs.) | Vehicle Identification Number | Use For Which Purchased |
| --- | --- | --- | --- | --- | --- | --- | --- |
|  |  |  |  |  |  |  | ☐ Personal ☐ Agricultural ☐ Commercial ☐ _____ |

Holder of this Certificate is entitled to the reversionary interest set forth in the above described retail installment contract. Such rights shall include the right to ownership reverting to such holder. Holder may assign or encumber this Certificate.

By signing below the above named Creditor hereby assigns this Certificate to the vehicle finance company pursuant to the terms and conditions contained in the applicable Term Sale Plan documents.

Creditor

By_____

Title_____

METHOD AND SYSTEM FOR FINANCING ACQUISITION OF VEHICLES

BACKGROUND OF INVENTION

1. Field of the Invention

One aspect of the present invention relates to a method for transferring legal title in a vehicle.

2. Background Art

In general, vehicle consumers either choose ownership or leasing upon deciding to acquire a vehicle. Ownership means that legal title in the vehicle is transferred to the vehicle consumer. Ownership may appeal to consumers that value owning a vehicle and/or intend on using the vehicle for a relatively long period of time, for example, five to seven years. Other vehicle consumers are drawn to leasing because of relatively low monthly payments and the opportunity to return the leased vehicle after a relatively short period of time, usually two to three years, and enter into another leasing arrangement for a new vehicle. This opportunity appeals to vehicle consumers that enjoy driving a new vehicle every two to three years, for example. In either situation, ownership or lease, consumers often finance acquisition of the vehicle.

Commonly, vehicle acquisition is financed by a vehicle finance company. Under one typical vehicle acquisition plan, the vehicle consumer purchases a vehicle from a vehicle dealer and enters into a retail installment contract (otherwise referred to as a RIC) with the vehicle dealer. The RIC is a contract which evidences the purchase of the vehicle on credit over time. The vehicle dealer then assigns the RIC to the vehicle finance company in exchange for the outstanding balance due on the RIC. The vehicle finance company collects a periodic payment, usually monthly, from the vehicle consumer.

Under a typical leasing arrangement, the vehicle manufacturer sells a vehicle to the vehicle dealer. The vehicle dealer usually transfers possession of a leased vehicle to the consumer after execution of a lease agreement and payment of a down payment, a first month lease payment and applicable taxes. The vehicle dealer then sells the vehicle and assigns the lease to the vehicle finance company. In return, the vehicle finance company typically delivers the purchase price to the vehicle dealer.

Although each financing arrangement has certain advantages as described above, typical ownership and leasing plans present disadvantages for vehicle consumers and vehicle financing companies. RICs afford vehicle ownership to vehicle consumers at the cost of higher monthly payments relative to leasing. Leasing usually offers relatively low monthly payments relative to ownership, but does not afford ownership. In addition, vehicle finance companies are required to file cumbersome reports with state and local jurisdictions on vehicles leased since they own the vehicles as physical assets. Moreover, many vehicle financing companies maintain separate business operations for ownership and leasing programs. Since many of the functions carried out by the two business operation are duplicative, finance companies experience business inefficiencies.

In light of the foregoing, there exists a need to provide a method and system for financing vehicle acquisition as with the sale via an RIC with relatively low payments as with a lease. There also exists a need to provide a method and system which shifts legal title to the vehicle consumer, thereby lessening the burden on vehicle finance companies to file cumbersome reports typical of leasing arrangements. Moreover, a method and system is needed that can allow vehicle finance companies to at least partially fold together their leasing business operation into their ownership business operation by transferring legal title as a comparable alternative to a typical leasing arrangement. There also exists a need for providing a method and system for financing acquisition of tangible personal property with at least some of the attributes mentioned above.

SUMMARY OF INVENTION

One aspect of the present invention is a method for financing acquisition of a vehicle. The method includes receiving a future interest in a vehicle in consideration for a future interest price upon transfer of a legal title in the vehicle in consideration for a legal title price. The method can further include financing the legal title price. In certain embodiments, the legal title price is financed by a vehicle finance company and the vehicle finance company receives the future interest. The future interest can be a reversionary interest or a remainder.

In certain embodiments, the receiving step is accomplished at least partially by utilizing an at least one computer and an at least one computer network.

A vehicle dealer can transfer the vehicle to a vehicle consumer. According to this transaction, the legal title in the vehicle is received by the vehicle consumer. The legal title can be provided for a legal title term. The legal title term can be about equal to the vesting period. The legal title term and the vesting period can be in the range of about one year to about six years. In certain embodiments, the future interest can vest upon expiration of the vesting period. The method can further include receiving the financed legal title price through a number of periodic payments.

According to another aspect of the present invention, a method for transferring legal title in a vehicle is disclosed. The method includes providing a vehicle and transferring a legal title in the vehicle in consideration for a legal title price while retaining a future interest in the vehicle. Notably, the future interest has a vesting period. The method can further include transferring the future interest in consideration for a future interest price.

In certain embodiments, the legal title price can be financed. The legal title price can be financed by a vehicle finance company. The future interest can be a reversionary interest or a remainder.

The transferring step can be accomplished at least partially by utilizing an at least one computer and an at least one computer network.

A vehicle dealer can provide the vehicle. The method can further include receiving the legal title in the vehicle. The legal title in the vehicle can be received by a vehicle consumer. The future interest can be received by a vehicle finance company. The legal title can be provided for a legal title term. The legal title term can be about equal to the vesting period. The legal title term and the vesting period can be in the range of about one year to about six years. The future interest can vest upon expiration of the vesting period. The method can further include receiving the financed legal title price through a number of periodic payments.

According to yet another aspect of the present invention, a computer-implemented system for transferring legal title in a vehicle is disclosed. The system includes an at least one server computer. The at least one server computer can be configured to receive identification and legal title information for a vehicle. The identification information can include a vehicle make, a vehicle model and a vehicle year information and the legal title information can include a legal title price and a legal title term. The at least one server computer can be further configured to transmit the identification and legal title information to at least partially effectuate transfer of a legal title in the vehicle. The vehicle can be transferred to a vehicle consumer.

In certain embodiments, the system can further include an at least one dealer finance company computer. The at least one dealer finance company computer can be configured to receive the vehicle information and the legal title information to at least partially effectuate transfer of the legal title in the vehicle. The legal title information can further include a future interest price and a vesting period.

According to another aspect of the present invention, a computer-implemented system for transferring legal title in a vehicle is disclosed. The system can include an at least one computer. The at least one computer can be configured to cause display of a website. The website can include identification and legal title information for a vehicle and the identification information can include a vehicle make, a vehicle model and a vehicle year information. The legal title information can include a legal title price and a legal title term. If a buyer decides to acquire the vehicle, the system can be configured to cause display of a form on the website. The form can be at least partially completed with buyer information through the website. The system can be further configured to transmit the at least partially completed form to at least partially effectuate transfer of legal title to the buyer.

According to another aspect of the present invention, a method for transferring legal title in personal property is disclosed. The method includes receiving a future interest in a personal property in consideration for a future interest price upon transfer of a legal title in the personal property in consideration for a legal title price. The personal property can be selected from the group consisting of: a tangible personal property and an intangible personal property. The personal property can be a good. The personal property can be a vehicle. In certain embodiments, the transfer of the legal title price can be financed.

According to yet another aspect of the present invention, a vehicle financing apparatus is disclosed. The apparatus includes a means for receiving a future interest in a vehicle in consideration for a future interest price upon transfer of a legal title in the vehicle in consideration for a legal title price and a means for financing the legal title price.

According to another aspect of the present invention, a method for financing acquisition in a vehicle is disclosed. The method includes receiving a future interest in a vehicle in consideration for a future interest price upon transfer of a legal title in the vehicle in consideration for a legal title price. A vehicle finance company can receive the future interest having a vesting period. The future interest can be a reversionary interest or a remainder. The legal title can be provided for a legal title term. The legal title term can be about equal to the vesting period. The method further includes financing the legal title price. The vehicle finance company can finance the legal title price. The method can further include receiving the financed legal title price through a number of periodic payments.

The above embodiments and other embodiments, features, and advantages of the present invention are readily apparent from the following detailed description of the best mode for carrying out the invention when considered in conjunction with the accompanying drawings.

BRIEF DESCRIPTION OF DRAWINGS

The features of the present invention which are believed to be novel are set forth with particularity in the appended claims. The present invention, both as to its organization and manner of operation, together with further objects and advantages thereof, may be best understood with reference to the following description, considered in conjunction with the accompanying drawings:

FIG. 6 depicts an example of a contract in accordance with an embodiment of the present invention; and FIG. 7 is an example of a reversionary interest certificate in accordance with an embodiment of the present invention.

DETAILED DESCRIPTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific functional details disclosed herein are not to be interpreted as limiting, but merely as a representative basis for the claims and/or as a representative basis for teaching one skilled in the art to variously employ the present invention.

It should be understood that the present invention relates to methods and systems for financing acquisition of vehicles and other personal property through transfer of legal title. This invention does not relate to a leasing arrangement. As used herein, legal title refers to complete and perfect title so far as the apparent right of ownership and possession. It should be understood that a right of possession need not be accompanied by legal title.

One aspect of the present invention is a method for transferring legal title in personal property. The personal property can be intangible or tangible personal property. It should be understood that tangible personal property can include, but is not limited to, vehicles, equipment, and machinery. It should also be understood that personal property can be mobile or immobile. In certain embodiments, the personal property can be mobile, for example, vehicles. The method can include receiving a future interest in a vehicle in consideration for a future interest price upon transfer of a legal title in the vehicle in consideration for a legal title price.

Figure 1:
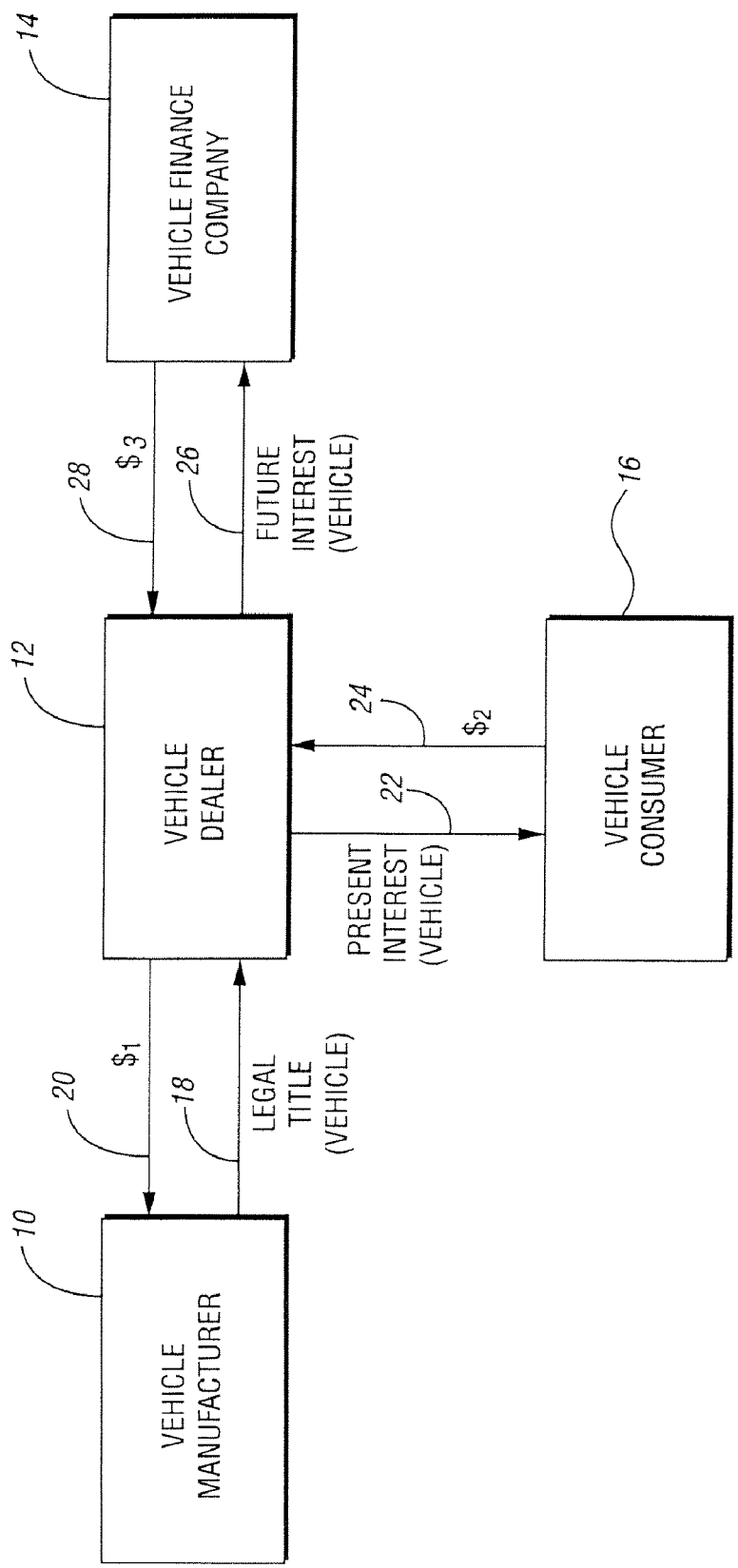
FIG. 1 represents a transactional flow chart of a method for transferring legal title in a vehicle in accord with a first embodiment of the present invention.

FIG. 1 represents a transactional flow chart of a method for transferring legal title in a vehicle in accord with one embodiment of the present invention. Block 10 represents an entity or entities which manufacturers vehicles, otherwise referred to as a vehicle manufacturer. The vehicle manufacturer can be of any corporate form or organization as long as it produces vehicles which are intended for vehicle consumer purposes, such as transportation. Block 12 represents an entity or entities dealing in sales or leasing of vehicles, otherwise referred to as a vehicle dealer. The vehicle dealer may or may not have a corporate affiliation with the vehicle manufacturer as long as it deals in vehicles with vehicle consumers. Block 14 represents an entity or entities which finance the sale or lease of vehicles for vehicle consumers, otherwise referred to as a vehicle finance company. Non-limiting examples of vehicle finance companies include credit companies affiliated with the vehicle manufacturer, banks, and other financing companies which focus on vehicle financing. Block 16 represents a vehicle consumer, which can be, for example, an individual, individuals, or an organization. Vehicle consumers are otherwise referred to as buyers or customers.

Arrows 18, 20, 22, 24, 26, and 28 represent a transaction flow for transferring legal title to the vehicle consumer. Arrow 18 represents transfer of legal title in a vehicle from the vehicle manufacturer to the vehicle dealer in consideration for a delivery price ($\$_1$). The vehicle dealer gives the delivery price ($\$_1$) to the vehicle manufacturer, as depicted by arrow 20.

After the vehicle dealer receives legal title in the vehicle, it deals with a vehicle consumer who agrees to purchase a present interest in the vehicle for a legal title term in consideration for a legal title price ($\$_2$). As an example, the legal title term can be from about one year to about six years. Non-limiting examples of vehicle consumers that may be interested in purchasing a present interest in a vehicle include individuals that value holding legal title in the vehicle while making low payments relative to ownership. An example of how these advantages are provided by the present invention is detailed below.

Arrow 22 represents transfer of the legal title in the vehicle for the legal title term from the vehicle dealer to the vehicle consumer. In consideration for the present interest, the vehicle consumer delivers the legal title price ($\$_2$) to the vehicle dealer, as depicted by arrow 24. It should be understood that legal title in the vehicle shifts from the vehicle dealer to the vehicle consumer by virtue of the transaction depicted by arrows 22 and 24. The legal title is encumbered by a future interest maintained by the dealer and which may subsequently be sold to the vehicle finance company. In certain embodiments, the vehicle consumer pays the legal title price via financed monthly payments lasting through the legal title term, although bi-weekly or bi-monthly payments, or other periodic payments, may be utilized to best fit a particular implementation of the present invention.

As represented by arrow 26, vehicle dealer 12 sells a future interest in the vehicle to the vehicle finance company 14. The future interest can vest in a vesting period. The vesting period can be about equal to the legal title term, which can be from about one year to about six years. In consideration, the vehicle finance company delivers a future interest price ($\$_3$) to the vehicle dealer as depicted by arrow 28.

By virtue of the two transactions depicted by arrows 22 and 24, and 26 and 28, respectively, legal title in the vehicle is transferred to the vehicle consumer, encumbered by a future interest maintained by the vehicle finance company. The future interest depicted on the legal title document may include "reversionary interest" or "remainder" language in the security interest section to denote that the vehicle finance company has the future interest in the vehicle. Advantageously, the vehicle consumer can elect to purchase unrestricted legal title in the vehicle at or near the end of the legal title term by paying the about future interest price via, for example, a balloon payment. It should be understood that the future interest price can vary depending on the time value of money and the present value of the vehicle.

A relationship can exist between the legal title price ($\$_2$) and the future interest price ($\$_3$). This relationship can be referred to as an present/future interest ratio. It should be understood that the present/future ratio can depend on many factors, including, but not limited to, consumer trade-in of an existing vehicle, residual value of the vehicle, and dealer promotions. In certain embodiments, a present/future interest ratio of about 100:1 to about 1:100 can exist between the legal title price and future interest price. In other embodiments, the present/future interest ratio can be in the range of about 3:1 to about 2:3.

Figure 2:
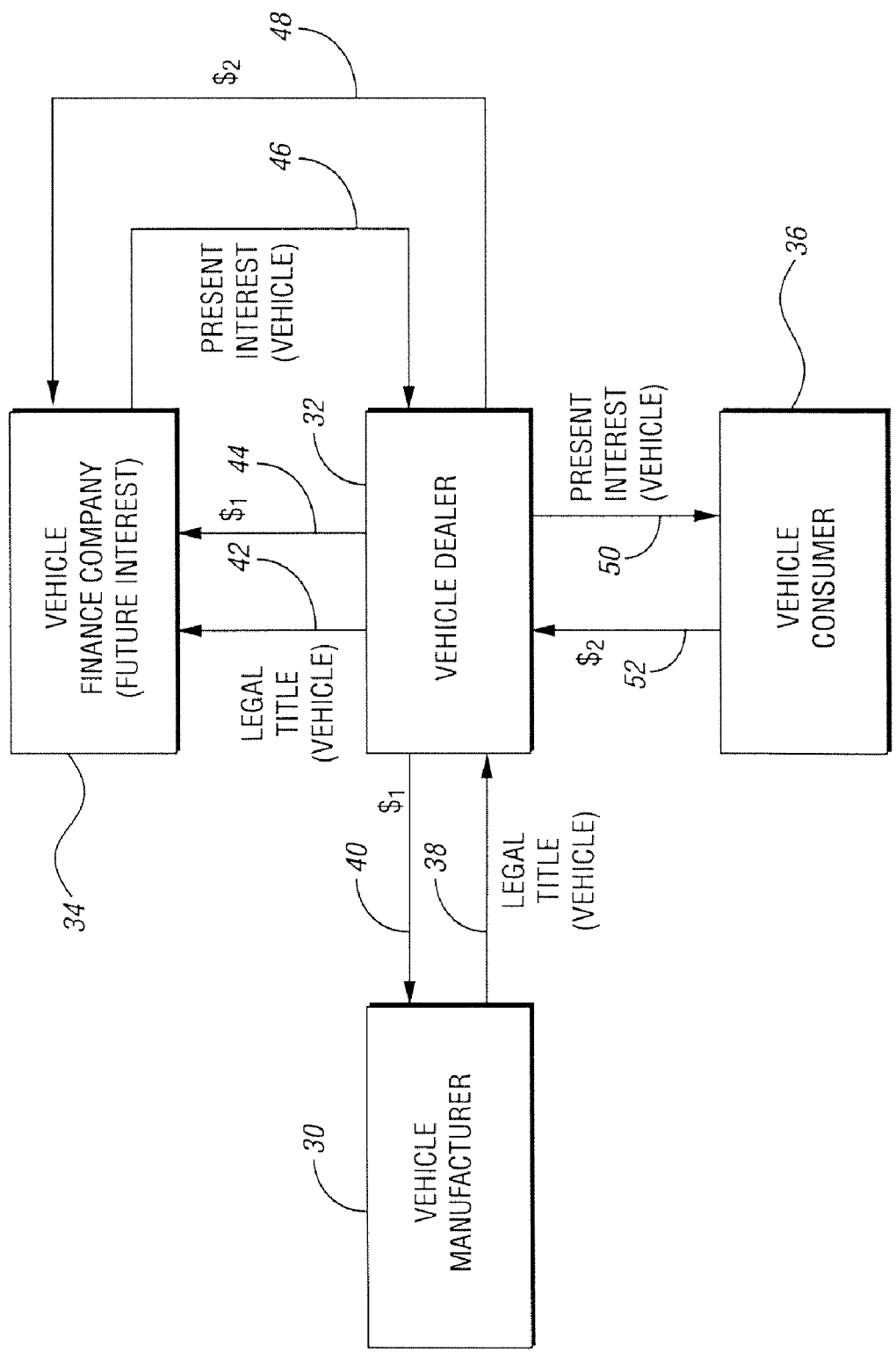
FIG. 2 represents a transactional flow chart of a method for transferring legal title in a vehicle in accord with a second embodiment of the present invention.

FIG. 2 represents a transactional flow chart of a method for transferring legal title in a vehicle in accord with a second embodiment of the present invention. According to FIG. 2, the transactional flow chart includes vehicle manufacturer 30, vehicle dealer 32, vehicle finance company 34, and vehicle consumer 36. As represented by arrows 38 and 40, vehicle manufacturer 30 sells legal title in a vehicle to vehicle dealer 32 in consideration for a delivery price ($\$_1$).

After the vehicle dealer receives legal title in the vehicle, it identifies a vehicle consumer (vehicle consumer 36) that agrees to purchase a present interest in the vehicle for a legal title term in consideration for a legal title price ($\$_2$). Once vehicle dealer 32 identifies consumer 36, it sells the vehicle to vehicle finance company 34 in consideration for the delivery price ($\$_1$), as depicted by arrows 42 and 44. As represented by arrows 46 and 48, vehicle finance company 34 sells the present interest for the legal title term in consideration for the legal title price ($\$_2$) to vehicle dealer 32. It should be understood that vehicle finance company 34 retains a future interest, i.e. a remainder, in the vehicle. As represented by arrows 50 and 52, vehicle dealer 32 sells the vehicle to vehicle consumer 36 for the present interest in consideration for the legal title price ($\$_2$). By virtue of the transactional flow depicted in FIG. 2, the legal title of the vehicle is transferred to the vehicle consumer, and covered by a future interest, i.e. the remainder, maintained by the vehicle finance company.

Figure 3:
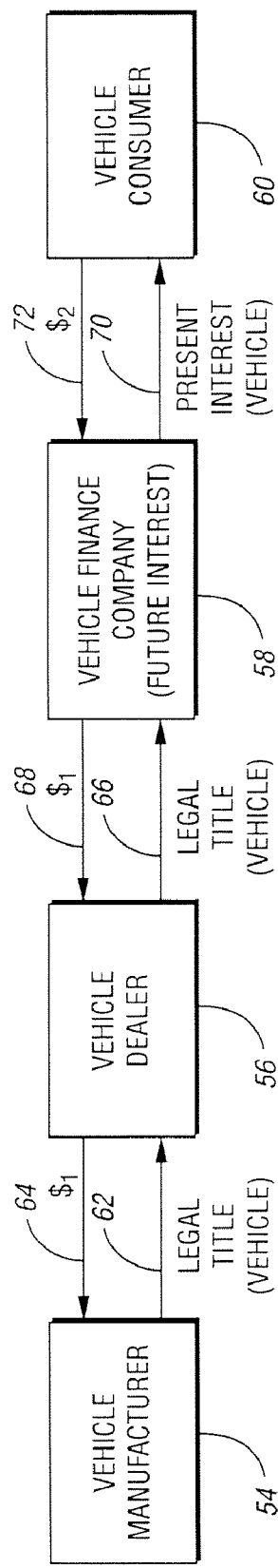
FIG. 3 represents a transactional flow chart of a method for transferring legal title in a vehicle in accord with a third embodiment of the present invention.

FIG. 3 represents a transactional flow chart of a method for transferring legal title in accord with a third embodiment of the present invention. According to FIG. 3, the transactional flow involves vehicle manufacturer 54, vehicle dealer 56, vehicle finance company 58 and vehicle consumer 60. Notably, vehicle finance company 58 can be a vehicle dealer acting in a capacity as an agent for vehicle finance company 58. As represented by arrows 62 and 64, vehicle manufacturer 54 sells legal title in a vehicle to vehicle dealer 56 in consideration for a delivery price ($\$_1$). Once vehicle dealer 56 identifies a vehicle consumer (vehicle consumer 60) that agrees to purchase a present interest in the vehicle having a legal title term in consideration for a legal title price ($\$_2$), vehicle dealer 56 transfers the vehicle to vehicle finance company 58 in consideration for the delivery price ($\$_1$)

As represented by arrows 70 and 72, vehicle finance company 58 transfers the present interest, i.e. encumbered legal title, to vehicle consumer 60 in consideration for the legal title price ($\$_2$). Vehicle finance company 58 retains a future interest, i.e. remainder, in the vehicle that vests once the legal title term expires. As a result of the transactional flow depicted in FIG. 3, legal title in the vehicle is transferred to the vehicle consumer, encumbered by the future interest, i.e. remainder, maintained by the vehicle finance company.

Figure 4:
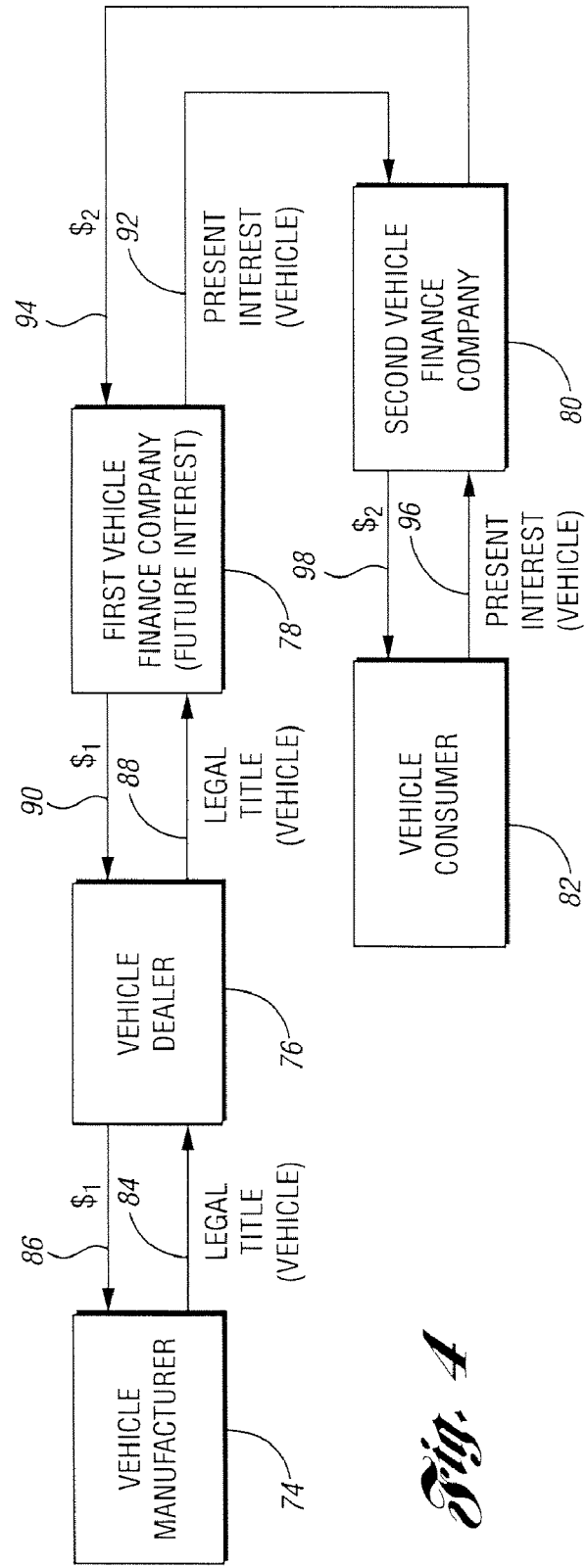
FIG. 4 represents a transactional flow chart of a method for transferring legal title in a vehicle in accord with a fourth embodiment of the present invention.

FIG. 4 represents a transactional flow chart of a method for transferring legal title in accord with an embodiment of the present invention. According to FIG. 4, vehicle manufacturer 74, vehicle dealer 76, first vehicle finance company 78, second vehicle finance company 80, and vehicle consumer 82 participate in the transactional flow. As depicted by arrows 84 and 86, vehicle manufacturer 74 sells a legal title in a vehicle to vehicle dealer 76 in consideration for a delivery price ($\$_1$). In turn, vehicle dealer 76 identifies a vehicle consumer (vehicle consumer 82) that agrees to purchase a present interest, i.e. encumbered legal title, in the vehicle for a legal title term in consideration of a legal title price ($S_2$).

Once identified, vehicle dealer 76 sells the legal title in the vehicle for the legal title term in consideration for the delivery price ($S_1$) to first vehicle finance company 78. Notably, first vehicle finance company 78 can be associated or affiliated with vehicle manufacturer 74. As depicted in blocks 92 and 94, first vehicle finance company 78 sells the present interest in consideration for the legal title price ($S_2$) to second vehicle finance company 80. Notably, second vehicle finance company 80 can be a finance company unaffiliated with vehicle manufacturer 74, otherwise referred to as a third party finance company, i.e. unaffiliated with vehicle manufacturer 74.

As depicted by arrows 96 and 98, second vehicle finance company 80 sells the present interest to vehicle consumer 82 in consideration for the legal title price ($S_2$). First vehicle finance company 78 retains a future interest, i.e. remainder, in the vehicle that vests after expiration of the legal title term, otherwise referred to as the vesting period. By virtue of the transactional flow depicted in FIG. 4, the legal title to the vehicle shifts to vehicle consumer, encumbered by the first vehicle finance company's future interest.

Figure 5:
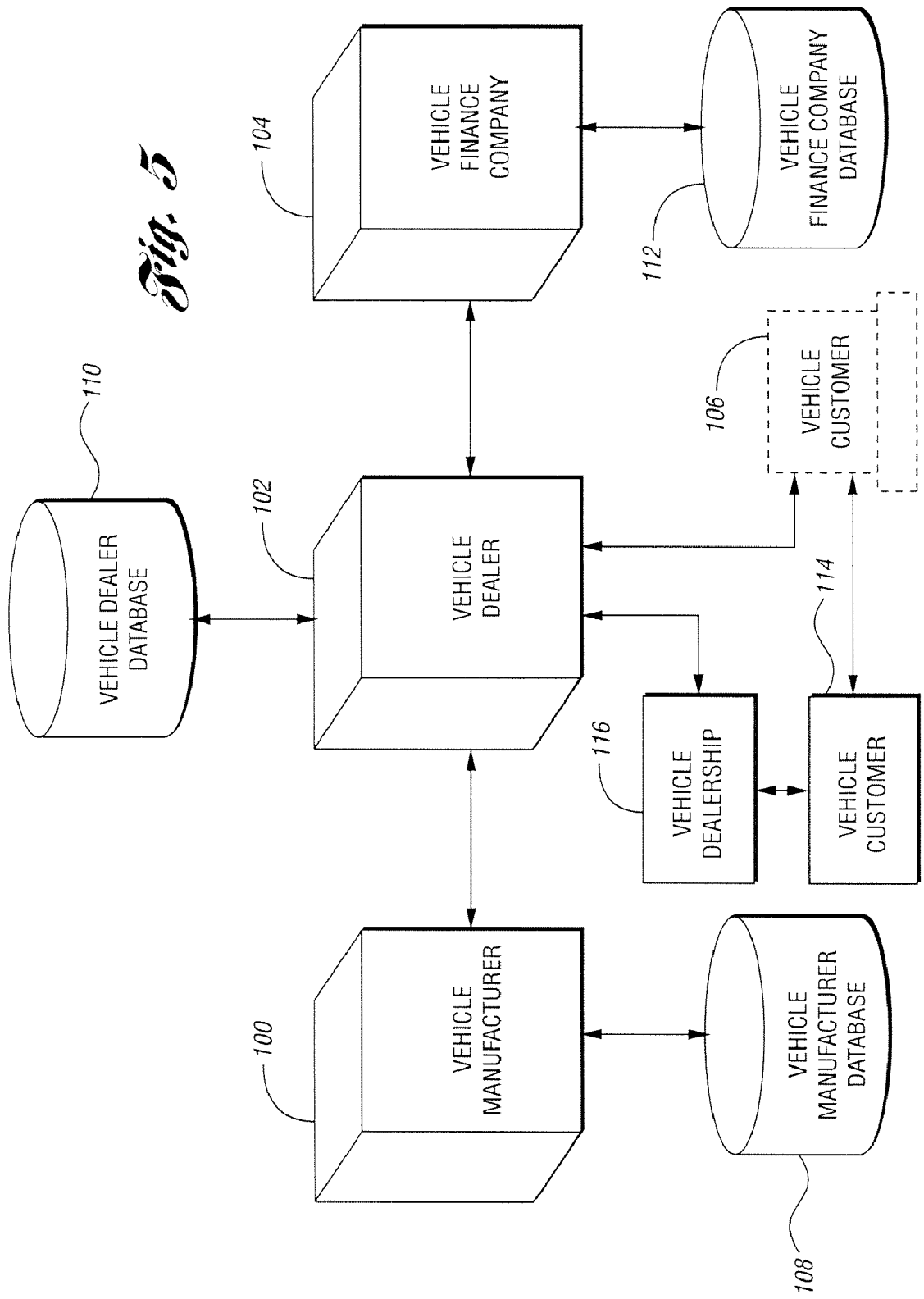
FIG. 5 represents a computer-implemented system for effectuating a transactional flow in accord with an embodiment of the present invention.

FIG. 5 represents a computer-implemented system for effectuating a transactional flow in accord with an embodiment of the present invention. It should be understood that elements of the computer-implemented system of FIG. 5 can be modified, rearranged, deleted, or amplified to best fit a particular implementation of the present invention.

According to FIG. 5, vehicle manufacturer computer 100, vehicle dealer computer 102, vehicle finance computer 104, and optionally, vehicle consumer computer 106 can be interconnected via a computer network. Vehicle manufacturer computer 100 can retrieve data and store information regarding vehicles in vehicle manufacturer database 108. The information can include, but is not limited to, vehicle information, for example, vehicle identification number, vehicle make, vehicle model, and vehicle year, and delivery price information. Vehicle dealer computer 102 can retrieve data and store information regarding vehicle transactions in vehicle dealer database 110. The information can include, but is not limited to, vehicle information and legal title information, such as legal title price, legal title term, future interest price and vesting period. Vehicle finance company computer 104 can retrieve data and store information in vehicle finance database 110. The information can include, but is not limited to, legal title information.

Vehicle consumer 114 can visit vehicle dealership 116 and meet with a dealer representative with the intention of acquiring a vehicle. Vehicle consumer 114 can agree to acquire a present interest, i.e. encumbered legal title, in the vehicle for the legal title term in consideration for an legal title price.

In certain embodiments, the vehicle dealer representative retrieves data from vehicle dealer database 110 regarding vehicle legal title in order to communicate legal title information to a vehicle consumer. In certain embodiments, this information includes legal title price and legal title term for the present interest. The legal title price and term can be determined by vehicle dealer computer 112 based on a number of variables, including, but not limited to, consumer trade-in of an existing vehicle, residual value of the vehicle being promoted, and dealer promotions. Advantageously, vehicle dealer computer 102 can determine these values while vehicle consumer 114 is at vehicle dealership 116. Computer 102 can recalculate the values based on the negotiation process that takes place between vehicle consumer 114 and vehicle dealership 116 before vehicle consumer 114 decides to purchase the present interest in the vehicle.

In certain embodiments, once vehicle consumer 114 decides to purchase the present interest in the vehicle, vehicle dealer computer 102 can transmit vehicle information and legal title information to vehicle finance computer 104 to at least partially effectuate transfer of legal title for the vehicle consumer. Vehicle finance computer 104 receives the information and processes it and transmits confirmation to vehicle dealer computer 102 for confirming the transfer of the vehicle to the vehicle consumer in consideration for the legal title price. As discussed in greater detail below, a contract and reversionary interest certificate can be used to input vehicle, consumer and transaction information. It should be understood that the contract can be, but is not limited to, a paper contract or an electronic contract. In certain embodiments, this information can be fed into the system disclosed above.

Figure 6:
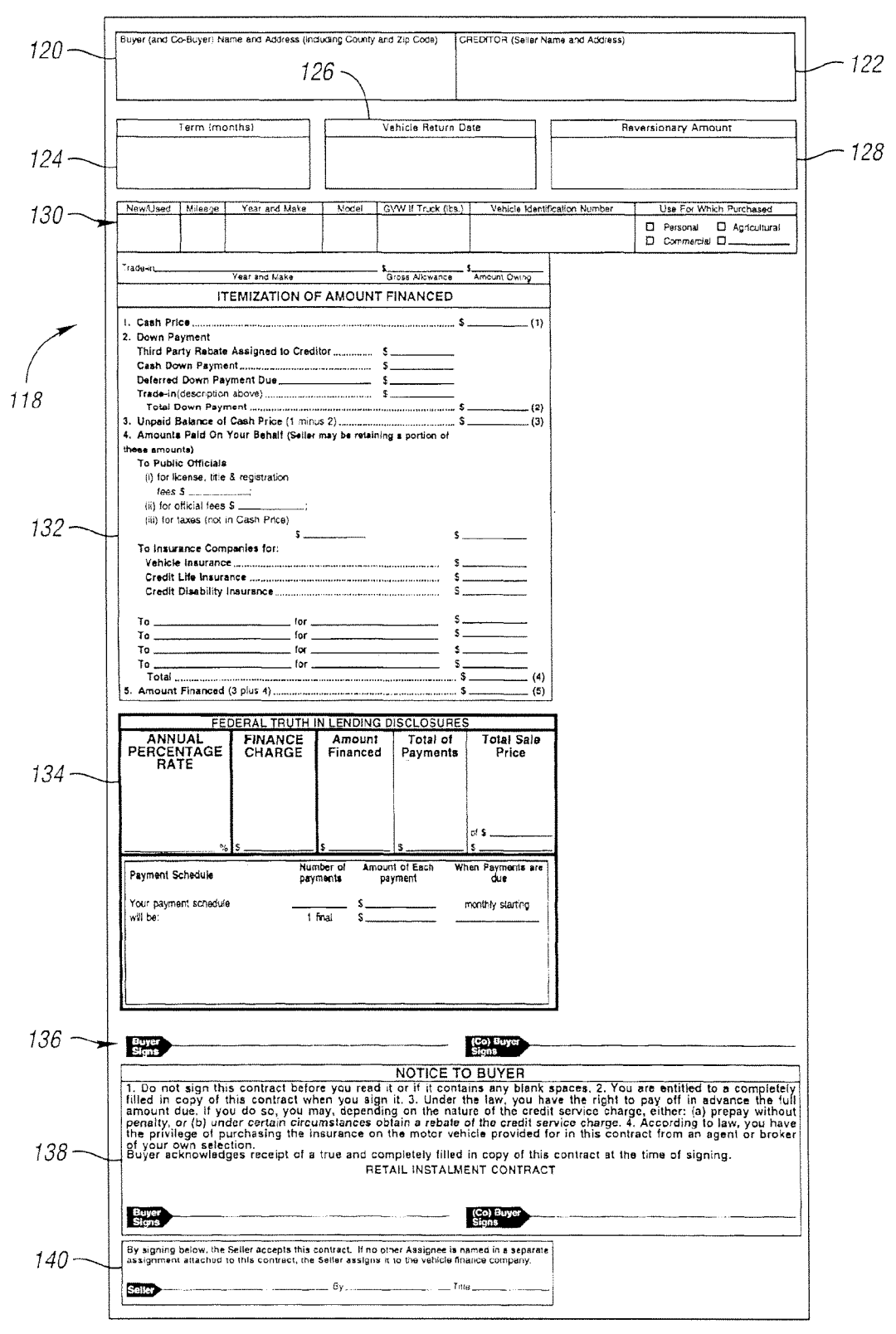

In certain other embodiments, vehicle dealership 116 can use a contract to at least partially memorialize the agreement between vehicle consumer 114 and vehicle dealership 116. FIG. 6 depicts an example of a contract in accordance with an embodiment of the present invention.

Contract 118 can include input boxes 120 and 122 for inputting buyer (and co-buyer if applicable) name and address (including county and zip code) and creditor (seller name and address). It should be understood that buyer refers to vehicle consumer, as used in other parts of this document. It should be understood that creditor refers to vehicle finance company, as used in other parts of this document.

In certain embodiments, the following statement can appear under input boxes 120 and 122: "You, the buyer (and co-buyer, if any), may buy the vehicle described below for cash or on credit for the term listed below. The cash price is shown below as 'Cash Price'. The credit price is shown below as 'Total Sale Price'. By signing this contract, you choose to buy the vehicle for the term listed below on credit under the agreements on the front and back of this contract". It should be understood that cash price refers to the negotiated legal title price for the present interest in the vehicle and the total sale price refers to the negotiated legal title price for the vehicle plus acquisition costs, as used in other parts of this document.

Contract 118 can also include input boxes 124, 126 and 128 for inputting term (in months for example), vehicle return date and reversionary amount, respectively. It should be understood that reversionary amount refers to the future interest price, as used in other parts of this document.

Contract 118 can also include input block 130 for inputting vehicle information such as new/used status, mileage, year and make, model, gross vehicle weight (GVW) (if truck) in pounds, vehicle identification number (VIN), and use for which purchased (personal, commercial, agricultural, other, etc.). Additionally, input block 130 can include trade-in information, including, but not limited to, year and make, gross allowance, and/or amount owing.

Contract 118 can include input block 132 for inputting an itemization of amount financed. In general, input block 132 can include, but is not limited to, the following items: cash price, down payment (third party rebate assigned to creditor, cash down payment, deferred down payment, and/or trade-in), unpaid balance of cash price, amount paid on the buyer's behalf, and/or amount financed.

It should be understood that contract 118 can also include an input block for insurance. Information pertaining to vehicle, liability, credit life, and/or credit disability insurance can be input into the insurance input block. The vehicle dealer can provide at least some of the insurance described above.

Contract 118 can include input block 134 for inputting a truth-in lending disclosure. In general, input block 134 can include, but is not limited to, the following information, annual percentage rate (APR), finance charge, amount financed, total amount of payments, total sale price and payment schedule. APR refers to the cost of the buyer's credit as a yearly rate. Finance charge refers to the dollar amount the credit will cost the buyer. Amount financed refers to the amount of credit provided to the buyer or at the buyer's behalf. The total amount of payments refers to the amount that the buyer will have paid when the buyer has made all scheduled payments. The total sale price refers to the total cost of the buyer's purchase in credit, including any down payment. The payment schedule can include, but is not limited to, number of payments, amount of each payment, and when payments are due.

Additionally, contract 118 can include a term sale disclaimer. For example, the term sale disclaimer can read as follows: "Term Sale: You are purchasing a full ownership interest in the vehicle for a limited term. The time period for which you are purchasing this vehicle is shown above in the 'Term' section. Your ownership interest will terminate on the Vehicle Return Date, unless otherwise provided in this agreement".

Moreover, contract 118 can include an excess wear, use and mileage charges disclaimer. For example, the disclaimer can read as follows: "EXCESS WEAR, USE AND MILEAGE CHARGES: You may be charged on the Vehicle Return Date for excessive wear based on our standards for normal use. At that time, you must pay to Creditor X cents per mile for each mile in excess of Y miles shown on the odometer."

Contract 118 includes signature line 136 for the buyer's (and potentially the co-buyer's) signature. Contract 118 can also include buyer notice block 138 for reminding the buyer to read the contract before signing and informing the buyer of any conditions under the contract. The buyer (and potentially the co-buyer) can sign in buyer notice block 138. Signature block 140 can be included for the seller's signature signifying that the Seller assigns the vehicle to the vehicle finance company.

In certain embodiments, a reversionary interest certificate can be used in addition to the contract to evidence the vehicle transaction. FIG. 7 is an example of a reversionary interest certificate in accordance with an embodiment of the present invention. Certificate 142 can include input boxes 144 and 146 for inputting buyer (and co-buyer, if any) name and address (including county and zip code) and creditor (seller name and address), respectfully. Certificate 142 can also include input boxes 148, 150 and 152 for inputting term (in months for example), vehicle return date, and reversionary amount, respectively.

Certificate 142 can also include input block 154 for inputting vehicle information such as new/used status, mileage, year and make, model, GVW (if truck) in pounds, vehicle identification number (VIN), and use for which purchased (personal, commercial, agricultural, other, etc.).

Certificate 142 can also include a statement setting forth the holder's rights. For example, the statement can read as follows: "Holder of this Certificate is entitled to the reversionary interest set forth in the above described retail installment contract. Such rights shall included the right to ownership reverting to such holder. Holder may assign or encumber this Certificate."

Certificate 142 includes signature block 156, which can include the following statement: "By signing below the above named Creditor hereby assigns this Certificate to the vehicle finance company pursuant to the terms and conditions in the applicable term sale plan documents." Signature block 156 can also include a line for the creditor's signature and title.

Many mechanisms are contemplated for inputting information onto the contract and/or the reversionary interest certificate. For example, the dealership representative can write the information onto a paper copy of the contract or the reversionary interest certificate with the help of vehicle consumer 114. Alternatively, the contract or the reversionary interest certificate can be stored in a digital format and can be accessed from vehicle dealer computer 102 through a user interface or a hand-held device, such as a personal digital assistant. The digital format can be a text-insertable PDF form. The dealer representative can input information into the text-insertable PDF form through the user interface. Once information entry is complete, the PDF form can be stored in vehicle dealer database 110. Moreover, the completed form can be output to a printer in order to provide a printed copy to vehicle consumer 114. The printed copy or the paper copy of the contract can be faxed or otherwise transmitted electronically to the vehicle finance company for processing the future interest and resale exemption certificate.

In an alternative embodiment, vehicle consumer 114 can contact vehicle dealership 116 through vehicle consumer computer 106 for investigating acquisition of a vehicle and entering information into the contract via a user interface if the user selects to acquire the vehicle. A non-limiting example of vehicle consumer computer 106 is a personal computer. In certain embodiments, the user interface can be a web-based user interface.

Having generally described the present invention, a further understanding can be obtained by reference to a certain specific example which is provided herein for purposes of illustration only and is not intended to be limiting.

The present example is based upon the transactional flow represented in FIG. 1. According to the example, a vehicle manufacturer sells a vehicle to a vehicle dealer in consideration for $21,000.00. It is understood that this value varies depending on many factors, including, but not limited to, the vehicle being sold, or a business arrangement between the vehicle manufacturer and the vehicle dealer.

The vehicle dealer then identifies a vehicle consumer that is interested in purchasing a present interest in a vehicle for a legal title price. It should be understood that the legal title price can vary depending on numerous factors such as dealer promotions, whether the vehicle consumer has a trade-in, and the negotiation process between the vehicle dealer and the vehicle consumer. In this example, the legal title price is $15,000.00. After identifying the vehicle consumer, the vehicle dealer sells a future interest in the vehicle to a vehicle finance company in consideration for a future interest price, which in this example, is $10,000.00. As a result of the two transactions outlined above, the vehicle consumer obtains legal title in the vehicle based on the present interest and is responsible for relatively low payments, typical of a leasing arrangement. It is understood that the vehicle consumer can make monthly payments on the $15,000.00 amount over a period of time approximately equal to a legal title term, comparable to those made under a leasing agreement.

In certain embodiments, the future interest price can be discounted to insure that the vehicle finance company obtains a reasonable return on its investment which is a discount to the price paid for the future interest. Using the numbers above, the future interest price can be discounted by a discount of $1,000, for example, to arrive at $9,000, meaning that the dealer would be paid $9,000 for the future interest. Accordingly, the legal title price, if paid for by the vehicle finance company, would reflect the discount on the future interest. For example, the vehicle finance company would pay the dealer $16,000.00 for the consumer's contract on the present interest that had a $16,000.00 amount financed and $9,000.00 for the future interest.

While the best mode for carrying out the invention has been described in detail, those familiar with the art to which this invention relates will recognize various alternative designs and embodiments for practicing the invention as defined by the following claims.

The invention claimed is:

1. A method for providing financing by a vehicle financing company for acquisition of a vehicle by a vehicle consumer, the method comprising:
    receiving a future interest in a vehicle by a vehicle financing company in consideration for a future interest price paid by the vehicle financing company upon transfer of a legal title in the vehicle to a vehicle consumer in consideration for a legal title price for a legal title term, the legal title price being an amount of money paid for a present possessory interest in the vehicle, wherein the receiving step is accomplished at least partially by utilizing an at least one computer and at least one computer network;
    providing financing by the vehicle financing company to the vehicle consumer for the legal title price of the vehicle;
    determining by the vehicle financing company via the at least one computer an unrestricted legal title price based on the future interest price and a balance of the financing provided by the vehicle financing company;
    receiving at or near the end of the legal title term the unrestricted legal title price; and
    transferring the future interest to the vehicle consumer so that the vehicle consumer receives the future interest and unrestricted legal title in the vehicle.

2. The method of claim 1 further comprising determining a present/future interest ratio representing the ratio of the legal title price to the future interest price.

3. The method of claim 1 wherein receiving the unrestricted legal title price includes valuing the future interest price based on a time value of money and a present value of the vehicle.

4. The method of claim 1 wherein the future interest is a reversionary interest or a remainder.

5. The method of claim 1 further comprising transferring by a vehicle dealer the vehicle to the vehicle consumer.

6. The method of claim 1 further comprising receiving by the vehicle consumer the legal title in the vehicle.

7. The method of claim 2 wherein the present/future interest ratio is in a range of 3:1 to 2:3.

8. The method of claim 2 wherein the present/future interest ratio is based on one or more of the following factors: a consumer trade-in of an existing vehicle, a residual value of the vehicle, or dealer promotions.

9. The method of claim 1 wherein the legal title term is in the range of one year to six years.

10. The method of claim 1 wherein the future interest vests upon expiration of a vesting period.

11. The method of claim 1 further comprising receiving the financed legal title price by the vehicle financing company through a first periodic payment made on a first periodic date and a second periodic payment made on a second periodic date during the legal title term, the legal title term beginning at the transfer of legal title to the vehicle consumer, wherein the second periodic payment date is after the first periodic payment date.

12. A method for transferring by a financing company legal title in personal property to a consumer, the method comprising:
    receiving a future interest in a personal property by a financing company in consideration for a future interest price paid by the financing company upon transfer of a legal title in the personal property to the consumer in consideration for a legal title price for a legal title term, the legal title price being an amount of money paid for a present possessory interest in the personal property, wherein the receiving step is accomplished at least partially by utilizing an at least one computer and at least one computer network; and
    providing financing by the financing company to the consumer for the legal title price of the personal property;
    determining by the financing company via the at least one computer an unrestricted legal title price based on the future interest price and a balance of the financing being provided by the financing company;
    receiving at or near the end of the legal title term the unrestricted legal title price; and
    transferring the future interest to the consumer so that the consumer receives the future interest and unrestricted legal title in the personal property.

13. The method of claim 12 wherein the personal property is selected from the group consisting of:
    a tangible personal property and an intangible personal property.

14. The method of claim 12 wherein the personal property is a good.

15. The method of claim 12 wherein the personal property is a vehicle.

16. The method of claim 12 further comprising:
    receiving the unrestricted legal title price by valuing the future interest price based on a time value of money and a present value of the personal property.

17. A method for providing financing by a vehicle financing company for acquisition of a vehicle by a vehicle consumer, the method comprising:
    receiving a future interest in a vehicle by a vehicle financing company in consideration for a future interest price paid by the vehicle financing company upon transfer of a legal title in the vehicle to a vehicle consumer in consideration for a legal title price for a legal title term, the legal title price being an amount of money paid for a present possessory interest in the vehicle, the future interest being a reversionary interest or a remainder, wherein the receiving step is accomplished at least partially by utilizing an at least one computer and at least one computer network;
    determining via the at least one computer a present/future interest ratio representing the ratio of the legal title price to the future interest price;
    providing financing by the vehicle financing company to the vehicle consumer for the legal title price of the vehicle; and
    receiving the financed legal title price by the vehicle financing company through a first periodic payment made on a first periodic date and a second periodic payment made on a second periodic date during the legal title term, the legal title term beginning at the transfer of legal title to the vehicle consumer, wherein the second periodic payment date is after the first periodic payment date.

* * * * *